Patented June 8, 1937

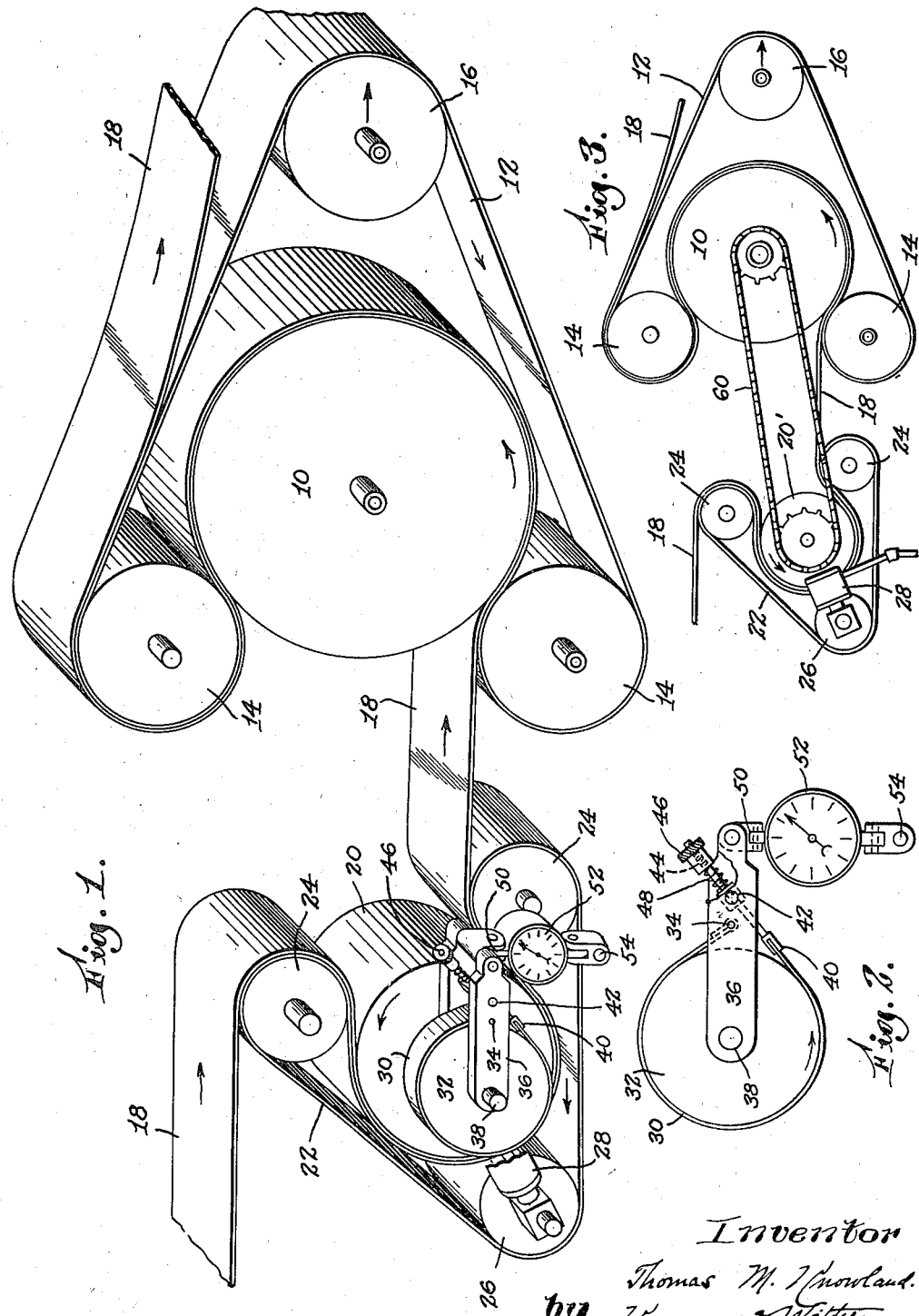

2,082,895

UNITED STATES PATENT OFFICE 2,082,895

METHOD OF AND APPARATUS FOR TENSIONING STRIP MATERIAL

Thomas M. Knowland, Belmont, Mass., assignor to Boston Woven Hose & Rubber Company, Cambridge, Mass., a corporation of Massachusetts Application June 21, 1935, Serial No. 27,728

8 Claims. (Cl. 18—6)

This invention relates to a method of and apparatus for tensioning strip material and is particularly applicable to the vulcanizing of elongated rubber articles, such as rubber belting. It is concerned primarily with the production of belting and the like in which it is desirable to have little or no tendency to stretch. The invention is of the general nature of that disclosed in my Reissue Patent No. 19,660, dated July 30, 1935, and in one aspect consists in certain improvements thereover. In another aspect my invention consists in a novel method of vulcanizing elongated rubber articles between a continuous band and a vulcanizing drum while holding the article under a constant and relatively high tension, built up therein by the drum and band pull on the article after it leaves the supply roll and as it is being drawn toward and onto the drum, thus producing a finished article having uniform inherent stretch in all portions thereof and eliminating the lack of uniformity found in such products manufactured by processes heretofore known.

The apparatus of my said patent requires a plurality of rolls about which the strip to be vulcanized is looped to provide adequate friction surfaces for gripping the strip and stretching it as it passes over such rolls from the let-off reel to the vulcanizing drum. That mechanism is entirely satisfactory for certain type of work although it requires considerable space since the low coefficient of friction of the strip on the rolls requires the ratio of strip tensions at the successive rolls to be kept relatively low. The coefficient of friction may be somewhat increased by the use of various friction surface coverings but such expedient is objectionable due to the relatively high tensions involved and the resulting danger of injuring the product.

In accordance with the present invention I propose to grip both faces of the strip to be vulcanized by and between opposing surfaces and thereby resist the stretching pull thereon. For this purpose I prefer to employ a single tension cylinder with a smooth metal or rubber covered surface and to derive the necessary frictional grip upon the strip to be vulcanized by the use of an opposing surface herein illustrated as an endless tension band or belt passing about a substantial arcuate portion of the cylinder and adapted to grip the strip therebeneath and press it firmly upon the cylinder. The frictional grip thus developed extends uniformly over a relatively large area of the strip and may be varied to give the desired amount of stretch to the strip.

Thus the invention provides relatively simple and compact mechanism by which any desired degree of tension in the strip may be secured without danger of injuring the product. It also provides apparatus of increased range and capacity and particularly adapted for successfully treating relatively thick belting.

Further features of the invention consist in a method and apparatus for vulcanizing continuous strip material while under tension wherein the frictional grip on the strip may be varied to suit requirements and wherein the amount of stretch given to the strip may be regulated and maintained at any desired ratio with respect to the length of the strip or otherwise.

The primary objects of the invention are the production of improved apparatus of the nature and for the purpose above and hereinafter defined and the making available a novel and improved method of manufacture wherein such apparatus may be usefully employed.

These and other features of the invention will be best understood and appreciated from the following description of a preferred embodiment therefore, selected for purposes of illustration and shown in the accompanying drawing in which:—

Fig. 1 is a perspective view of an apparatus embodying my invention; and

Fig. 2 is an enlarged side elevation of a portion of the mechanism shown in Fig. 1; and Fig. 3 is a view in side elevation of an apparatus embodying a modified form of the invention.

The apparatus herein illustrated includes a heated vulcanizing drum 10 having an endless metal tension band 12 extending around a substantial arcuate portion thereof. The band is supported on three rollers of which the two rollers 14 are mounted on fixed bearings and are so arranged that the portion of the band 12 therebetween provides an open loop passing around and in contact with the cylindrical surface of the drum. The tension in the band and its pressure of contact with the drum 10 is maintained by an adjustable roll 16 and may be varied by adjusting this roll bodily, as indicated by the arrow and disclosed in Patent No. 2,039,271. The drum 10 is slowly rotated in the direction of the arrow and the strip 18 to be vulcanized is maintained under severe pressure between the surface of the drum and the band and is vulcanized during such contact and passage.

Prior to my invention herein and as explained in my said patent vulcanizing operations have been performed by feeding the article to and holding it tightly in contact with the vulcanizing drum or platen, the article being thus fed and vulcanized substantially in its normal condition and usually in an intermittent manner. The resulting product has been a vulcanized article lacking in uniformity particularly in that different portions or sections thereof have different amounts or degrees of inherent stretch. The machine illustrated herein has provision for eliminating this objectionable result and producing a product having substantially a uniform stretch coefficient throughout its length, this provision embodying means for placing the article under a relatively high tension as it is fed to the vulcanizing drum and for maintaining such tension during the vulcanizing operation.

The stretching or tensioning mechanism illustrated in the apparatus herein shown comprises a single cylinder 20 mounted in lateral alignment with the vulcanizing drum 10. An endless tension band or belt 22 is supported on fixed rolls 24 and an adjustable roll 26 and the portion thereof between the rolls 24 forms an open loop encircling a substantial arcuate portion of the cylinder 20. The tension on the band and its contact pressure with the cylinder may be varied by adjusting the roll 26, as by means of hydraulic cylinders 28 and plungers which engage the bearings of the roll. The strip 18 to be vulcanized passes from the let-off reel over the top roll 24 and about the cylinder 20 beneath the band 22.

The tension cylinder 20 is provided at one end with a portion 32 of reduced diameter and with this cooperates a brake band 30, for resisting rotation of the cylinder. One end of the brake band is anchored at 34 to an arm 36 pivoted upon the shaft 38 which constitutes the axis of the cylinder and the other end is connected to a yoke 40 pivoted to the arm 42. This latter connection includes a screw-threaded rod 44 extending from the yoke and having threaded thereto a thumbnut 46, a spring 48 being provided between the thumbnut and the yoke. The tension of the band may be adjusted by rotating the thumbnut and the drag or braking effect on the cylinder thus regulated.

The free end of the arm 36 is connected to the load element 50 of a weighing scale 52 anchored at the opposite side by a pin 54. It will be apparent that the rotation of the cylinder 20 in the direction of the arrow will tend to swing the arm upwardly and that such movement will be resisted by the connection thereof with the scale at 50. It will, furthermore be apparent that the scale will register the extent of braking resistance of the brake band 30 on the cylinder and that this resistance may be varied by adjusting the thumbnut 46.

The strip 18 to be vulcanized passes from a supply reel to the upper roll 24 and from thence into the bite between the band 22 and the cylinder 20. The strip then continues around a large arcuate portion of the tension cylinder beneath the band 22 and then over the lower roll 24 and heated roll 14 and into the bite between the band 12 and the vulcanizing drum 10. The strip then continues around a large arcuate portion of the drum beneath the band 12, at which portion and during which passage it is vulcanized, and then passes over the top of the roll 14 to a suitable rewind reel. It will be understood that the rolls 16 and 26 are adjustable to a position giving proper tension to the bands 12 and 22 thereby providing the desired pressure thereof against the drum and cylinder and the required degree of tension in the strip being treated. Power is applied to rotate the vulcanizing drum slowly in the direction of the arrow, whereupon the strip is drawn forwardly as indicated.

It will be apparent that the band 22 passes around a substantially arcuate portion of the cylinder 20 and presses the strip 18 therebeneath into firm contact with the cylinder. Thus the strip is gripped over a relatively large area thereof between opposing surfaces which surfaces are held against free movement with the strip by means of the brake band 30 which resists rotation of the cylinder. Thus, in overcoming the braking action of the brake band 30 on the cylinder, the rotation of the vulcanizing drum stretches the strip to a predetermined degree depending upon the extent of such braking action. It will furthermore be apparent that this braking action can be varied by adjusting the nut 46 and the extent thereof is directly indicated on the scale 52. It should also be noted that the gripping of the strip between opposing surfaces engaging over a relatively large area thereof permits the use of smooth gripping surfaces eliminating possible nipping or other injury to the product.

The mechanism shown in Fig. 3, and indicated by like reference characters primed, is substantially the same as that already described except that, instead of resisting rotation of the cylinders 20 and 20' by means of a brake band, I connect such cylinder directly to the vulcanizing drum by means of gearing and a chain drive 60. This gearing is such that the ratio of the rotary surface speed of the vulcanizing drum is slightly greater than that of the cylinder. It will be readily apparent that such arrangement provides for a predetermined ration of stretch in the strip to be vulcanized, this ration being that insured by the positive driving connection between the tension cylinder 20' and the vulcanizing drum 10.

Having thus described my invention what I claim as new and desire to secure by Letters Patent of the United States is:—

1. A machine for continuously tensioning moving strip material preparatory to vulcanizing it comprising, in combination, a cylinder about a substantial arcuate portion of which the strip passes, an endless belt also passing about such arcuate portion of the cylinder in position to press the strip into frictional contact with the cylinder, means for resisting rotation of the cylinder, and a rotatable vulcanizing drum for engaging the strip and drawing it from and against resistance to rotation of the cylinder.

2. A machine for continuously tensioning moving strip material preparatory to vulcanizing it comprising, in combination, a cylinder about a substantial arcuate portion of which the strip passes, means pressing the strip into frictional contact with the cylinder, means for resisting rotation of the cylinder, and a rotatable vulcanizing drum for engaging the strip and drawing it from and against the resistance to rotation of the cylinder.

3. A machine for continuously tensioning moving strip material comprising, in combinaton, a cylinder about a substantial arcuate portion of which the strip passes, an endless belt also passing about such arcuate portion of the cylinder in position to press the strip into frictional contact with the cylinder, means for varying the resistance of the cylinder to rotation, means for indicating the degree of such resistance, and a rotatable drum for engaging the strip and drawing it from and against the resistance to rotation of the cylinder.

4. A machine for continuously tensioning moving strip material comprising, in combinaton, a cylinder about a substantial arcuate portion of which the strip passes, an endless belt also passing about such arcuate portion of the cylinder in position to press the strip into frictional contact with the cylinder, a rotatable drum for engaging the strip and drawing it from the cylinder, and means providing an operative driving connection between the drum and cylinder.

5. A machine for continuously tensioning moving strip material comprising, in combination, a cylinder about a substantial arcuate portion of which the strip passes, an endless belt, a plurality of rolls carrying the belt and providing an open loop therein passing more than 180 degrees around the cylinder, the belt and cylinder being adapted to receive the strip therebetween, means for resisting rotation of the cylinder, and a rotatable drum for engaging the strip and drawing it from and against the resistance to rotation of the cylinder.

6. A method of tensioning strip material preparatory to vulcanizing it, consisting in gripping the opposite faces of a relatively large area thereof between movable opposing surfaces, resisting free movement of one of said surfaces with the strip, and drawing the strip longitudinally in a manner overcoming said resistance and stretching the strip an amount proportional to said resistance.

7. The method defined in claim 6 wherein said opposing surfaces are concentrically curved.

8. A method of tensioning strip material preparatory to vulcanizing it, consisting in gripping the opposite faces of a relatively large area thereof between movable opposing surfaces, engaging the strip at a point remote from said surfaces, and drawing the strip from the surfaces to such a point while permitting movement of one of said surfaces with the strip at a predetermined less speed than the speed of the strip at said point whereby stretching the strip to a predetermined increase in its length.

THOMAS M. KNOWLAND.